(12) United States Patent
Bickham et al.

(10) Patent No.: US 7,113,761 B2
(45) Date of Patent: Sep. 26, 2006

(54) RF POWER DEVICE WITH ON-CHIP DIGITAL CONTROL AND OPTICAL INTERFACE

(75) Inventors: Richard S. Bickham, Cary, IL (US); Joseph Schultz, Wheaton, IL (US); Dale Anderson, Colleyville, TX (US); Mark Van Horn, Arlington, TX (US)

(73) Assignee: Motorola, Inc., Schaumburg, IL (US)

( * ) Notice: Subject to any disclaimer, the term of this patent is extended or adjusted under 35 U.S.C. 154(b) by 457 days.

(21) Appl. No.: 10/680,836

(22) Filed: Oct. 7, 2003

(65) Prior Publication Data

US 2005/0075090 A1 Apr. 7, 2005

(51) Int. Cl.
*H04B 1/28* (2006.01)
(52) U.S. Cl. ............... 455/333; 455/151.2; 455/556.1
(58) Field of Classification Search ............... 455/334, 455/344, 355, 323, 333, 150.1, 151.1, 151.2, 455/313, 550.1, 556.1
See application file for complete search history.

(56) References Cited

U.S. PATENT DOCUMENTS

| 5,339,184 A | * | 8/1994 | Tang | 398/116 |
| 6,249,621 B1 | | 6/2001 | Sargent, IV et al. | |
| 6,448,505 B1 | * | 9/2002 | Hiraoka et al. | 174/260 |
| 6,801,767 B1 | * | 10/2004 | Schwartz et al. | 455/426.2 |
| 2002/0080448 A1 | * | 6/2002 | Kim et al. | 359/145 |
| 2003/0027597 A1 | * | 2/2003 | LaGrotta et al. | 455/561 |

* cited by examiner

*Primary Examiner*—Edward F. Urban
*Assistant Examiner*—Nhan T. Le

(57) ABSTRACT

RF power device module (500) having an RF power device chip (206) which integrates an RF power device (208) with at least one of DC detector circuits (201, 202), RF detector circuits (203, 204), and thermal detector circuit (235) which cooperate with optical emitter/detector components (213) that supports a bi-directional optical link (210) made through free space with diagnostic processing and control circuits implemented on a separate chip (214) mounted within the same enclosure (205). The bi-directional optical link (210) enables interpretation of detection signals (227) received from the RF power device chip (206) and the feed back of default or other management and control signals (229) sent back to the RF power device chip (206) in response to the detected and analyzed conditions. The RF power device module (500) can be used in RF power transistors, such used in a base station, or mobile or portable transmitters, used in telecommunications, or in RF power amplifiers and instrumentation amplifiers in general.

24 Claims, 6 Drawing Sheets

RF POWER DEVICE WITH ON-CHIP DIGITAL CONTROL AND OPTICAL INTERFACE

FIELD OF THE INVENTION

This invention relates generally to systems employing radio frequency (RF) power devices, and more particularly, systems featuring integrated RF power devices and control.

BACKGROUND OF THE INVENTION

Communication systems are known comprising a plurality of base stations that provide communication services to remote or mobile units located in corresponding service coverage areas of the base stations. Remote unit receivers include circuits for measuring the signal strength of received signals and transmitting a received signal strength indication (RSSI) to a monitoring base station to indicate the signal strength of the carrier received by the receiver. To account for changes in RSSI as the remote unit moves and so forth, the serving base station will issue commands directing the remote unit to increase or decrease its power as the need arises. Typically, as the remote unit moves to the periphery of or into an obstructed location in the serving base station coverage area, the transmit power of the remote unit as well as the transmit power of the base station must be increased to account for an increase in path losses between the serving base station and the remote unit.

If insufficient RF power is produced by the base station transmitter to transmit a modulated carrier, the remote receiver cannot accurately demodulate voice signals and decode the data. On the other hand, if the base station's transmitter transmits the carrier signal with too much power, the performance of adjacent channels may be affected and possible jamming thereof may result.

RF power devices and circuits, such as those used in cellular telephone base stations, typically include power amplifiers. As well known, base stations are often exposed to a broad temperature range and varying RF power. In addition to variations in temperature and RF output power, there are also variations in bias voltage, frequency and load impedance. A need often arises to compensate for inadvertent changes of bias current in RF power amplifiers over temperature, power fluctuations, bias voltage frequency, or load impedance. In non-constant envelope applications such as code division multiple access (CDMA) or time division multiple access (TDMA), in particular, control of quiescent current is often needed to improve the response linearity or gain flatness of the power amplifiers, while for constant envelope applications such as the global system for mobile communications (GSM) bias voltage drop compensation is often needed to control output power or efficiency.

FIG. 1 represents a conventional system 100 for monitoring RF power device performance and handling fault management in which input and output direct current (DC) detection circuitries 101, 102, and reverse and forward RF detection circuitries 103, 104, are used to sense the operation state of the RF power device 108. They are implemented in a different chip, wafer or discrete components mounted on printed wiring board or substrate from the RF power device chip 106. The detected information is formatted by data formatting circuitry 111 and then transmitted via hardwire means 112 to separate diagnostic and control circuitry 114 used to process, interpret, and diagnose the detected information. The hardwire means 112 is typically an electrical connection made conventionally via printed traces on a printed wiring board. Fault management and control signals are relayed back to the RF power device 108 via the same hardwire means 112 on the PC board.

However, the use and reliance on the hardwire means as the communication link for the detected information and the fault management signals has problems. For instance, the hardwire electrical connection is subject to coupling from the high power RF signal associated with the operation of the nearby RF power device. This can lead to malfunctions in the circuitries, unless appropriate bypassing components are provided in the interconnect lines and circuitry, that typically increases design complexity and manufacturing costs. The hardwire means also can cause instability due to the creation of sneak feedback paths or RF loading of the RF amplifier input and output matching circuits.

Another drawback associated with conventional RF power device fault detection systems is the necessity of using an assembly of different dies, chip set or discrete components mounted on printed wiring board or substrate, to support the detection circuitries and the RF power device. Interconnecting these various separate dies for intercommunication and operation creates design, fabrication and performance issues. The off-chip arrangement of the detection circuitry can induce mismatch errors in the RF power circuitry. Also, the hardwired multi-chip arrangements are susceptible to interconnect failures, which reduces reliability. The inter-chip hardwiring arrangement also can slow the system's performance speed.

There are also conventional circuit tester systems applied to test a circuit by making use of one or more coaxial cables or optical fibers as an optical interface that physically extend between a device-under-test and a probe card, which is in turn connected to a load card and a circuit tester. As will be appreciated, communication links requiring physical interfaces between a device-under-test and a circuit tester can be more tolerable when the device-under-test is not yet installed in an enclosure or other location difficult to access under which it will be actually put into service.

BRIEF DESCRIPTION OF THE DRAWINGS

The above needs are at least partially met through provision of the RF power device with on-chip digital control and an optical interface described in the following detailed description, particularly when studied in conjunction with the drawings, wherein.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are typically not depicted in order to facilitate a less obstructed view of these various embodiments of the present invention.

DETAILED DESCRIPTION OF THE DRAWINGS

Pursuant to these various embodiments, a radio frequency device module can comprise an active radio frequency power device having a control signal input and digital control logic that is formed integral to the active radio frequency power device. In a preferred embodiment this digital control logic will comprise an information input and a control signal output that is operably coupled to the control signal input of the active radio frequency power device. In a preferred embodiment the radio frequency device module will also comprise a free-space optical communications interface that is also formed integral to the active radio frequency power device and that has a received signal output that is operably coupled to the information input of the digital control logic.

In a preferred approach, the module will further comprise an operational status detector that is also formed integral to the active radio frequency power device and that has an input that is responsive to an operational state of the active radio frequency power device and a detected status output that is operably coupled to an input of the free-space optical communications interface. Depending upon the needs of a given application, the operational state noted above can comprise any of a direct current value that is associated with the active radio frequency power device (such as, but not limited to, a bias level), a radio frequency power condition that is associated with the active radio frequency power device (such as, but not limited to, forward and or reflected power levels), a thermal state that is associated with the active radio frequency power device, to name a few.

So configured, within a single integrated structure such as a single integral integrated circuit, an active radio frequency power device can operate and be monitored with respect to at least one operational state to provide resultant monitoring information electrical signals, which electrical signals can then be converted to corresponding resultant monitoring information optical signals in optical free-space. A variety of benefits are achieved including reduced costs and form factor requirements along with potentially increased efficacy and improved control and response.

Figure 1:
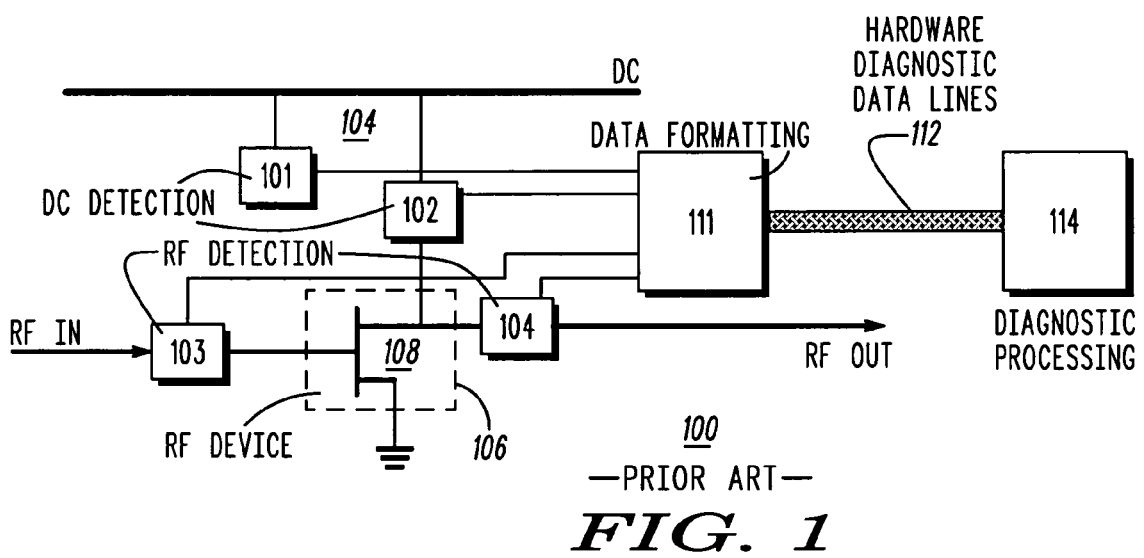
FIG. 1 is schematic block diagram of a conventional RF power device fault detection and control system.
Figure 2:
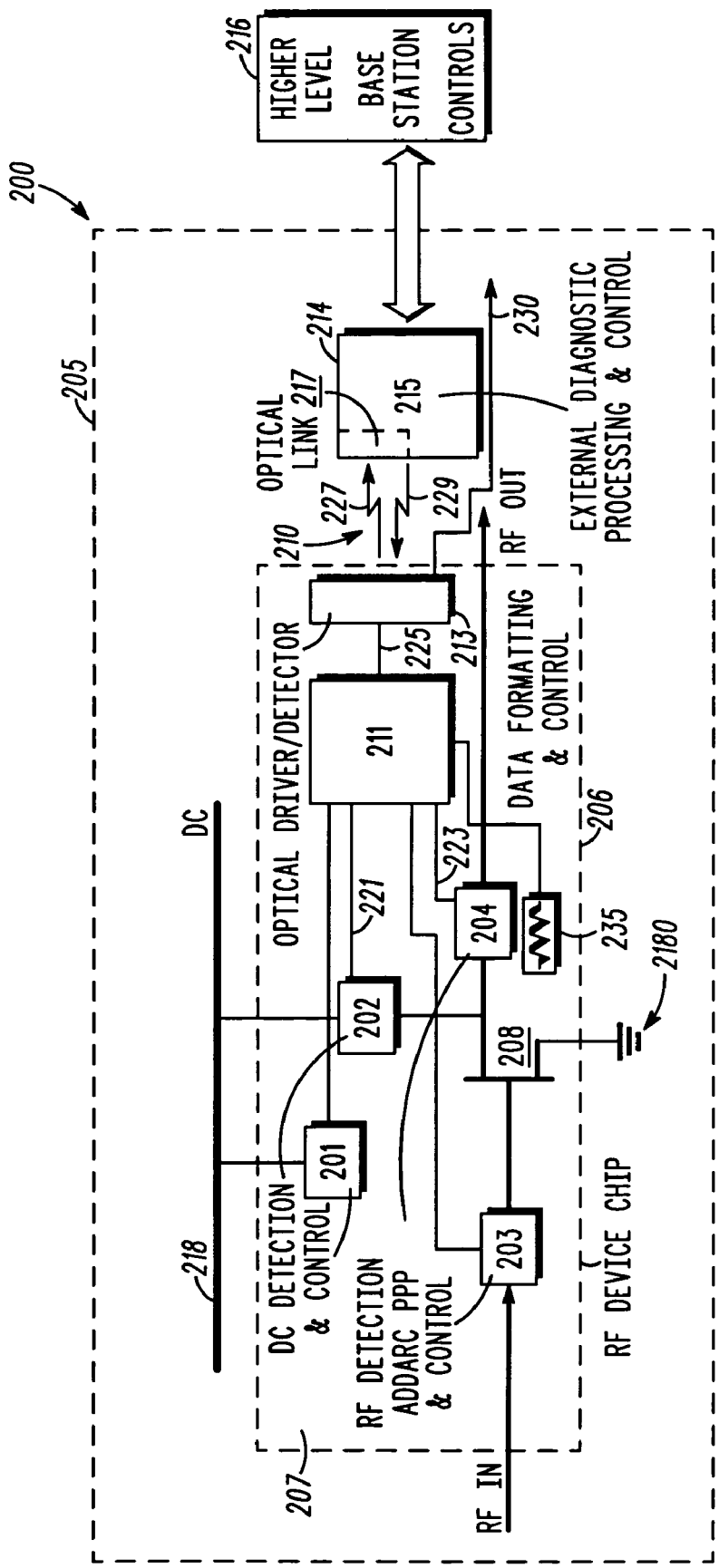
FIG. 2 is schematic block diagram of an RF power device fault detection and control system in accordance with an embodiment of the present invention.

Referring to FIG. 2, an RF Power device diagnostics and fault management system 200 is housed within an enclosure 205 in modular form. RF power device 208 is implemented in chip or wafer 206 together with operational state detection circuitry such as DC detection and control circuitry 201, 202, respectively, RF detection and control circuitry 203, 204, respectively, and/or a thermal detector such as a temperature sensor 235 (such as a thermistor) that is positioned proximal to the RF power device 208 to thereby sense a present thermal state thereof Such elements can be used to directly or inferentially sense various operational states or properties of the RF power device 208. Voltage supply conductor 218 is at an operating potential of RF power device (chip or wafer) 206 relative to ground potential at voltage supply conductor 2180. Although this illustration describes RF detectors, DC detectors, and thermal detectors as forming part of the RF power device system, it will be understood that only one may be needed to provide the desired or needed level of diagnostic functionality for a give application, and that all types of detectors may not be desired or needed in every application.

A bi-directional optical interface 210 is provided between the RF power device chip or wafer 206 bearing the RF power device 208 and the separate or external diagnostics processing and control chip or circuit 214. This optical interface 210 is supported by an optical driver/detector 213 fabricated in RF power device chip 206, which functions as on-chip optical signal emitter and detector, which is used together with an I/O optical window 219 formed in a wall of RF Power Device package 207 to emit (or receive) optical signals 227 (or 229) (it will be understood that such optical signals can be any optical signals including analog signals and digital signals).

Data formatting and control circuitry 211 also is implemented in the RF power device chip 206, which processes the electronic signals 221 and 223, and so forth, received from the detection circuitries and reformats them into data signals 225 that are processable by the optical emitter/detector component 213. The optical data signals are transmitted off RF power device chip 206 as optical signals 227 that are propagated through free space via the optical interface 210. That is, the optical signals 227 sent through the optical interface 210 are sent through air or other gaseous environment or a vacuum, and not through physical communication media such as optical fibers, coaxial cables, hard wires, or so forth. A complementary, synchronized optical driver/detector 217 also is provided on separate chip or circuit 214 to detect signals 227 and transmit control or feed back signals 229 back from diagnostic processing and control circuitry on chip or circuit 214 to chip 206. In addition to the bidirectional optical interface 210, an optional local diagnostic optical link 230 can provide a visible local diagnostic optical signal (such as, for example, a red optical output, a green optical output, or the lack of any visual output) emitted through an optical window 219 and that is discernable by the human eye for local diagnostic purposes such as rapid and easy identification of a faulty RF power device 208 or RF power device chip or wafer 206 so that service can proceed quickly and efficiently. (If desired, this locally discernable visual cue can alternatively be served by the outbound portion of the bi-directional optical interface 210.)

As noted above, the RF power device package 207 can include an output "window" 219 that has good transmission properties in the optical region. An example of this is a light emitting diode (LED) for the outbound link and a photo detector for the inbound link, both coupled between the inside and outside of the package 207 enclosing the RF power device chip or wafer 206 by one or more lenses.

Package 207 contains the above components and is mounted within enclosure 205. The optical interface 210 provides a bi-directional optical communication link between fault detection data processing circuitry implemented on the first chip 206 located inside the enclosure 205 together with off-chip diagnostic processing and control integrated circuitry 215 provided on a separate chip or circuit 214. Diagnostic and control chip or circuit 214 can communicate with higher level control systems 216 within the same base station in which the RF Power device diagnostics, fault management and control system 200 is used. Higher level control system 216, as such, does not form part of the RF Power device diagnostics, fault management and control system 200, although it can interact with it as described herein.

As seen in this embodiment of the present invention, an RF power device integrates both the detector circuits and a means to transmit the detected information from the RF power device via a non-physical optical link for subsequent detection at an interface point to interpretation and processing circuitry. Further, the optical link can be bi-directional, allowing fault management signals to be sent back to the RF power device in response to the detected RF power device conditions, states, or properties. More particularly, the present invention integrates DC circuitry, RF circuitry, and thermal detector circuitry into an RF Power device along with circuit means to collect and format the data from the detectors, and modulate an optical driver that outputs an optical signal from the device for subsequent reception and processing at a nearby, off-chip location provided within the same enclosure as that housing the RF power device. This invention makes possible the use of an optical link using free space propagation between the RF power devices used in RF power amplifiers, and the circuitry used to interpret and process diagnostic information indicative of the operating parameters of the RF power device, and if necessary, provide fault management and control feedback on the detected conditions.

Figure 3:
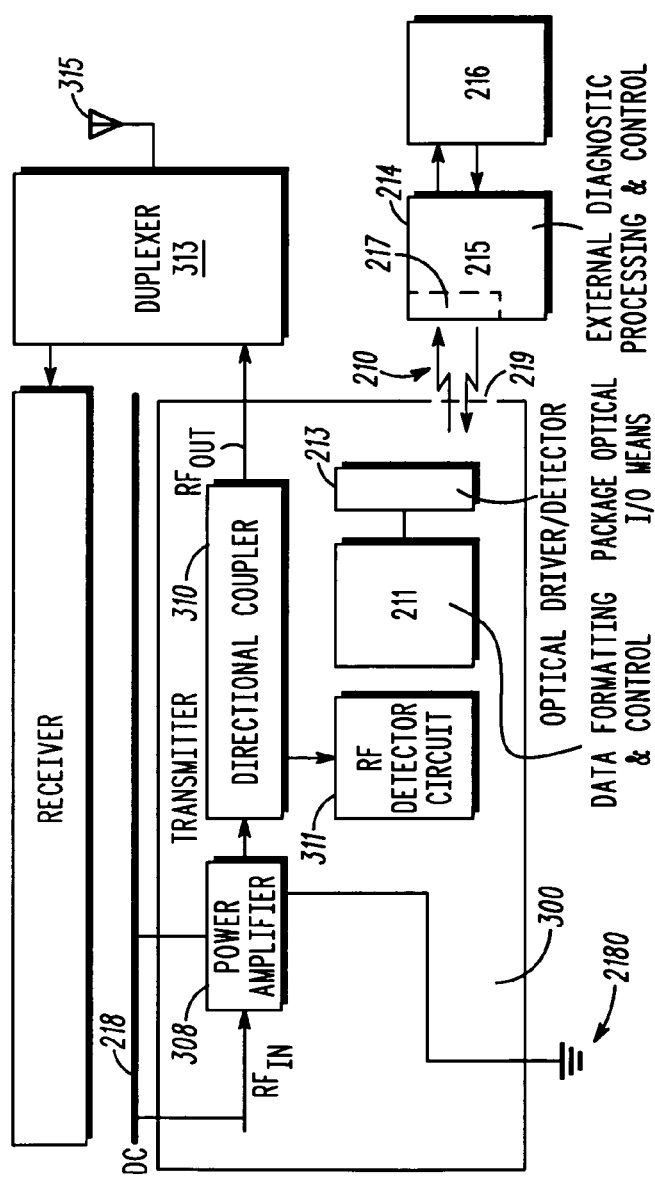
FIG. 3 is schematic block diagram of an isolated portion of the RF power device fault detection and control system illustrated in FIG. 2 used in accordance with one embodiment of the present invention.

Referring to FIG. 3, an isolated portion of the RF power device fault detection and control system illustrated in FIG. 2 is represented as forming part of a transmitter 300. The purpose of this illustration is to exemplify one non-limiting mode for implementing an RF detection circuit, such as circuit 204, in FIG. 2. The transmitter includes frequency generation circuits (not shown) and RF and baseband processing circuits (not shown) and includes the power amplifier 308 comprised of at least a first RF power device 208 (and optionally at least first DC and RF detection and control circuits and thermal detection circuits) for amplifying an RF carrier modulated with baseband signals. A single power amplifier 308 is shown merely to simplify the illustration, but it will be appreciated that a multi-stage, cascade, or parallel amplifier arrangements also can be used that are conventionally used for that purpose in RF transmitters.

The sampling of the transmitted power by the power amplifier can be efficiently done by use a directional coupler or voltage rectifier according to techniques that are generally known in the RF power device field. The directional coupler or voltage rectifier is formed in the RF Power device chip 206 previously discussed by applying semiconductor processing methods and materials referenced herein. In general, when using a directional coupler, the forward transmitted power is sampled and provided as an output at a "forward" port of the coupler. In the event reflected power is of interest, the reflected power of a transmitter is sampled and provided as an output at a "reverse" port of the directional coupler. In general, the sampled power at the forward port of the coupler is converted to a DC voltage and may be used in a feedback loop involving the above-mentioned diagnostic chip 214 to increase or decrease the transmitter power or RF power device input power to maintain the same at a specified level or adjusted to some other appropriate level.

In the non-limiting illustration as shown in FIG. 3, the amplified RF carrier, as modulated by other signals, is coupled through the directional coupler to a duplexer 313, which then couples the amplified signal to the antenna 315 for radiation thereof. The directional coupler is of conventional semiconductor design. The amplified signal can be coupled therethrough to either an optional duplexer 313 substantially unattenuated, or alternatively the transmitter may be coupled directly to an antenna in one-way systems, such as one-way paging, or in systems that employ antenna diversity. A forward sampling port (not shown) of the directional coupler 310 may couple a portion of the RF energy to an RF detector circuit 311. The RF detector circuit rectifies the RF signal and converts the same to a corresponding DC signal. The DC signal output by the RF detector circuit 311 is representative of the transmitter power output by the power amplifier 308. Power circuit diagnostic and control circuitry 215 is included on chip 214, which receives the sensed information by the RF detector circuit via the above-mentioned data formatting and control circuit 211, optical driver/detector 213, and optical interface 210. The power control circuitry 215 at chip 214 compares the data based on the DC signal output by the RF detector circuit 311 and provides an error signal to the power amplifier 308. The error signal is of such a magnitude and polarity so as to change or modify the power output by the power amplifier 308 and maintain the same at a predefined level or adjust to another value if appropriate. Should the prescribed transmitter power be intentionally changed to a new level, the reference level of the power circuit control circuit is changed accordingly, whereupon the power amplifier 308 is caused to produce a new transmitter power output.

Figure 4:
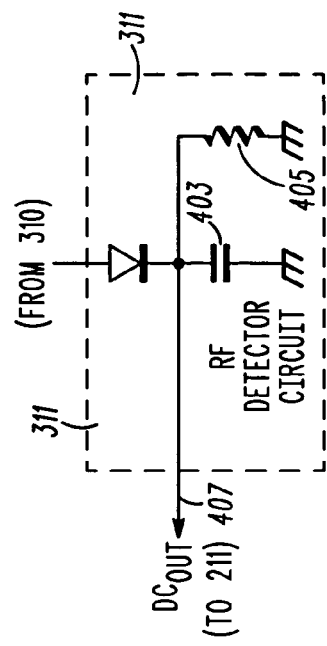
FIG. 4 is a schematic diagram of an RF detection circuit in the isolated portion of the system illustrated in FIG. 3 used in accordance with one embodiment.

Referring to FIG. 4, the RF detector circuit 311 implemented in semiconductor chip 206 including an RF rectifier diode 401 for providing rectification of the sampled power signals existing at the sample port of the directional coupler 310. Diode rectifiers are routinely incorporated into RF detector circuits. At constant RF power carrier by the main line (not shown) of the directional coupler 310, the RF rectifier 401 will carry a given rectified signal current. The current will be converted to a filtered voltage by capacitor 403. Any change in the transistor power through directional coupler 310 will change the current through the detector load resistor 405. The DC output voltage on line 407 is a function of the forward junction voltage of rectifier diode 401. In an alternative arrangement for RF detection, a voltage rectifier circuit of conventional design can be used as the sensor. The reflecting RF detector and DC detectors and bias control circuit are not shown in FIG. 3 to simplify the illustration.

Although this illustration references a forward directional coupler, it will be appreciated that a reverse (or reflected) directional coupler, and DC voltage and current detectors also could be used. Also, while this illustration describes a power control scenario, other fault management functions, such as DC bias control, gain and phase adjustment and RF matching network adjustment could be used.

The DC detectors 201 and 202 in FIG. 2 can be of conventional design with the qualification that the sensed current or bias voltage data is transmitted as data signals to a microprocessor, or digital signal processor, including diagnostic and control circuitry on chip 214 which receives the sensed information by the DC detector circuit via the above-mentioned data formatting and control circuit 211, optical driver/detector 213, and optical interface 210. The microprocessor's diagnostic and control circuitry 215 at chip 214 compares the data to reference values and if necessary provides an error signal to active bias compensation circuits provided within DC detection and control circuits 201 and 202 on chip or wafer 206 which can reset or effect appropriate adjustments in the direct current (DC) or quiescent biasing point for RF power amplifier 208 or matching circuits.

Figure 5:
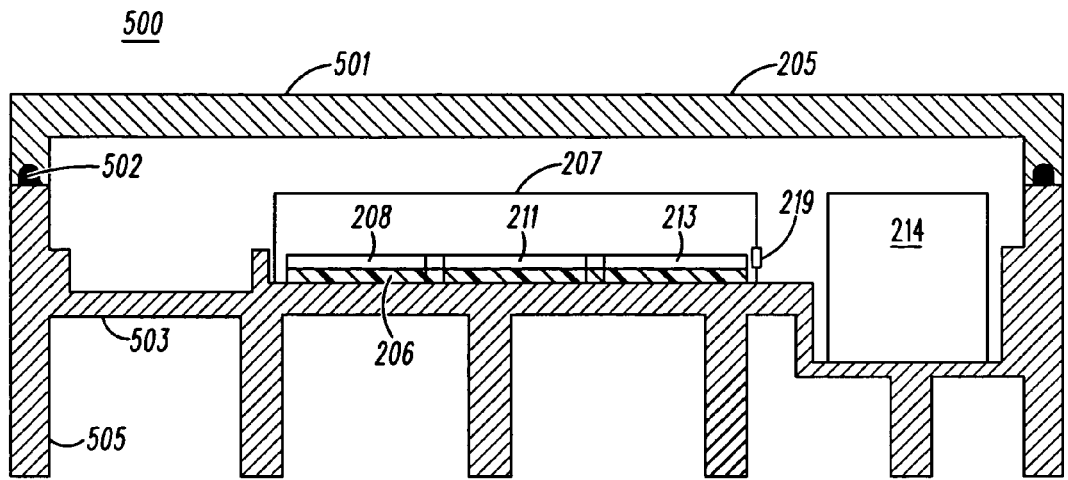
FIG. 5 is a cross sectional view of a power module containing the RF power device fault detection and control system illustrated in FIG. 2.

Referring to FIG. 5, in one embodiment, the enclosure 205 and above-described integrated components on chips 206 and 214 housed therein together represent a power module 500. The power module 500 includes the enclosure 205, which in this illustration includes a metal cover 501, such as aluminum, and may include gasketing 502 and extrusions, such as silver-silicone elastomer, to provide electromagnetic shielding. The cover 501 is attached to heat sink base 503, which also may comprise aluminum, but may be fabricated from any high thermal conductivity metal. The enclosure can optionally include a forced air cooling device (not shown), such as a DC or AC fan, such as in a conventional manner to provide forced air over the fins 505 of the heat sink 503. The package 207 can be a plastic and ceramic casing that is microstrip compatible or surface mountable, and includes an integral optical lens 219. In one embodiment, the enclosure 205 and above-described integrated components housed therein together represent a power module 500. As an alternate approach a non-metal cover, such as plastic, may be used.

Figure 6:
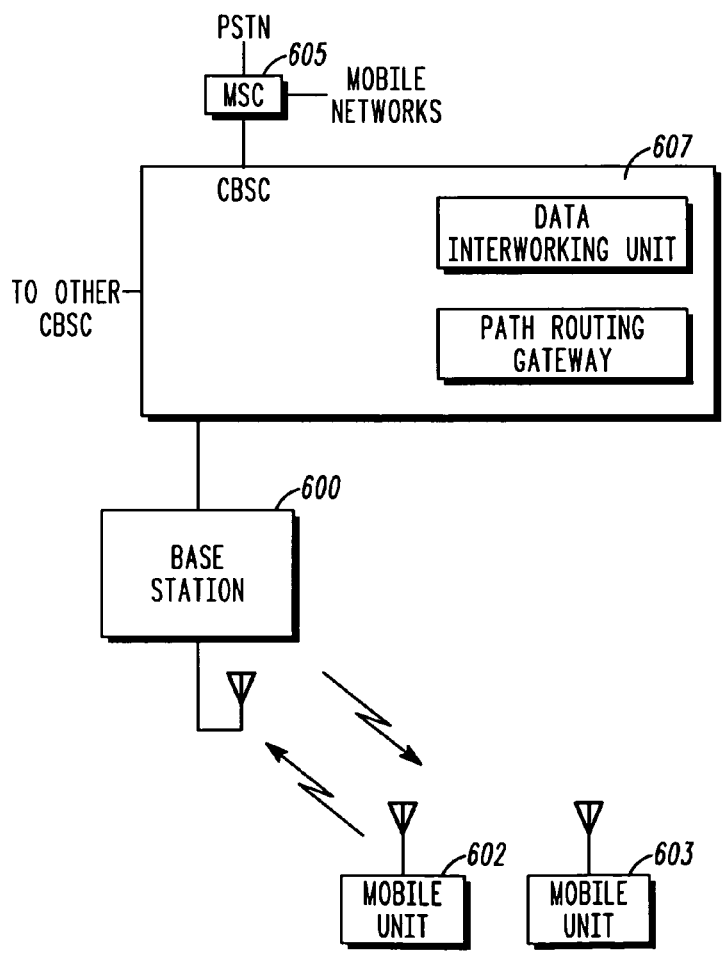
FIG. 6 is a block diagram of a communications system including a base station including a transmitter incorporating the RF power device fault detection and control system illustrated in FIG. 2 and mobile units.

Referring to FIG. 6 is a block diagram of a base station 600 that can incorporate the power module 500 of FIG. 5, and mobile units 602 and 603 are shown. The number of mobile units is not particularly limited to the number used in this illustration. As shown in this example, a public switch telephone network (PSTN) is connected to a mobile switching center (MSC) 605, that also communicates with other mobile networks. The MSC 605, in turn, connects to a central base station controller (CBSC) 607 that includes a data interworking unit and a path routing gateway. An output from the CBSC 607 is supplied to base station 600 that includes a transmitter and antenna and hardware and software for timing of the signal and for optionally spreading out the signal.

Figure 7:
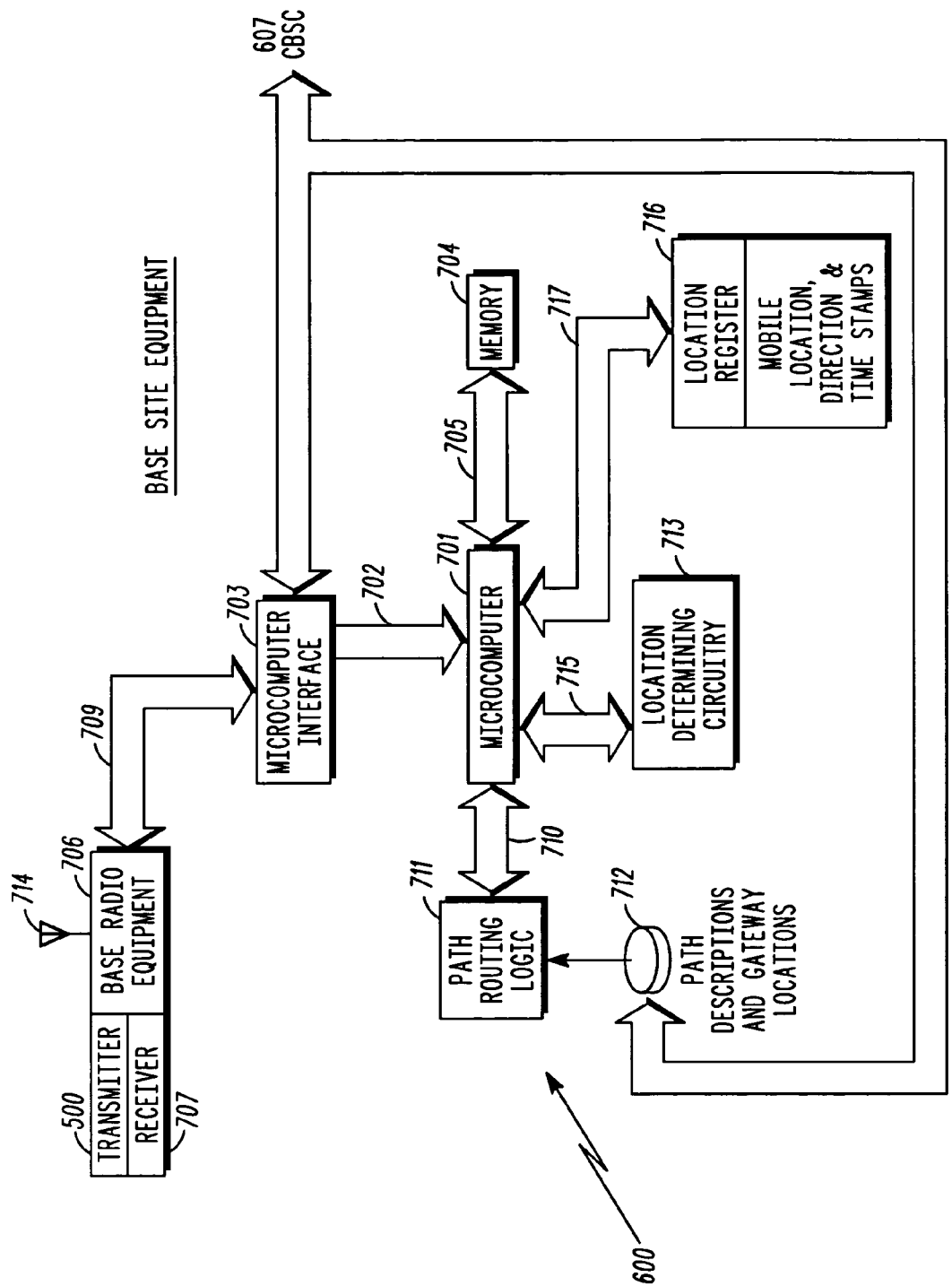
FIG. 7 is a block diagram showing a base station including a transmitter incorporating the RF power device fault detection and control system illustrated in FIG. 2.

FIG. 7 illustrates a block diagram of equipment used at a base station 600 located at a gateway base site. A microcomputer 701 receives data via a buss 702 from a microcomputer interface 703 that in turn receives messages and data packets from a switch controller (not shown) connected to CSBC 607. This same buss 702 also permits coupling between the microcomputer 701 and base radio equipment 706 via buss 709. This base radio equipment 706 includes a transmitter 500, such as described above, having a power module. The base radio equipment 706 also preferably includes a receiver 707 for receiving wireless data, such as voice and data packet messages, and optionally location information, such as from mobile station via a satellite and may supply such data through an analog-to-digital (A/D) converter (not shown) to the microcomputer interface 703. A memory 704 is coupled by a buss 705 to the microcomputer 701. The base radio equipment 706 may also provide digital data directly to the microcomputer interface 703 via a buss 709. Also coupled to the microcomputer 701 via buss 710 is path routing logic 711, which in turn is coupled to a source or table of path descriptions and gateway locations. As shown, the path descriptions and gateway locations table 712 is also coupled to the CSBC 607.

Location determining circuitry 713, which receives location data from a satellite via satellite antenna 714 in one optional approach, is coupled by a buss 715 to the microcomputer 701. Location register 716, including mobile location, direction and time stamps is coupled via a buss 717 to the microcomputer 701 as shown. If desired, the location register could be located at another location such as at a switch or at a service control point (SCP). When a message or a data packet is received at the base station 600 for a particular mobile unit 602, 603, and so forth, the message is transmitted by radio transmitter to the designated mobile station.

One of the facets of a preferred embodiment is that the diagnostic fault management and control circuitry provided on external chip 214 (see FIG. 2) can, in turn, communicate with higher levels of the base station, such as microcomputer 701 via buss 709 and microcomputer interface 703. In this manner, the power module is not merely deployed as a stand-alone assembly with preprogrammed diagnostic, fault management and control. In this embodiment, the microcomputer 701 can be used to update, reset, review, monitor, introduce commands related to channel traffic control, and so forth, relative to the diagnostic fault management and control circuitry and functionality provided on external chip 214 to enhance the benefits obtained by the system.

As will be appreciated, such an embodiment provides an advantageous integrated system for RF power device diagnostics and fault management, and, more particularly, such a system having an integrated circuit wafer or chip including an RF power device and fault detectors, and an optical interface for communications between the integrated circuit wafer or chip and diagnostic processing and control.

This approach eliminates the necessity of using a hard wire interconnect to convey error detection and correction information between different chips supporting the RF power device. The present embodiment provides an interface between a semiconductor chip with co-existent on-chip metal and optical signaling and a processing entity located off-chip without need for a physical connection, such as an optical fiber, to support propagation of the optical signaling.

Having detection circuitry co-located on-chip with the RF power device eliminates error resulting from off-chip detection, i.e. error that otherwise could occur due to parasitics associated with bringing a sample of the RF signal off-chip. This is done by an optical detector in the diagnostic processing circuitry, which is located within the same enclosure as the RF device, while being sufficiently separated to ensure no significant RF interference, receives the diagnostic information for subsequent interpretation and processing, and an optical driver in the processing circuitry that transmits fault management signals to the RF power device. Another advantage of this approach is reduced pin count on higher level packages for RF power devices (RF integrated circuits for example), since a large number of separate signals (which would normally require separate pinouts and possibly multiple ground reference pinouts) can be multiplexed onto a single optical link which does not require a hardwire pinout.

The systems for integrated RF power device diagnostics, fault management and control of such embodiments can be used in virtually any application that uses RF power transistors. Examples include, but are not limited to, base station transceivers and base station transmitters in particular, mobile and portable transmitters in telecommunication applications, RF power amplifiers, and instrumentation amplifiers, and so forth.

For example, the RF Power device diagnostics and fault management system 200 of the present embodiment can be used for both non-constant envelope applications like CDMA and TDMA power amplifiers and constant envelope applications like GSM and analog power amplifiers. The system 200 also is applicable to other linear applications such as multicarrier and orthogonal frequency division multiplexing (OFDM). The system 200 is suitable for multimode and multi-band cellular telephone applications. The system 200 also can be used in mobile telephone applications, and in other non-cellular applications such as public or private 2-way land mobile radio systems or other non-two-way applications such as instrumentation amplifiers.

Figure 8:
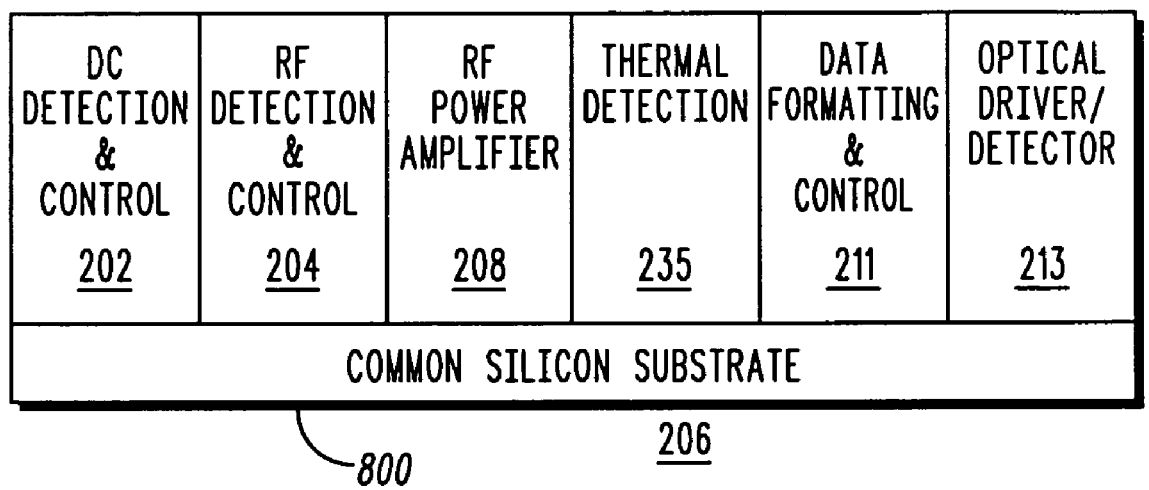
FIG. 8 is a schematic block diagram in elevation view of the RF power device chip constructed according to an embodiment of the present invention.

Referring to FIG. 8, an aspect of a preferred embodiment that is relevant to implementation is directed to the capability of fabricating an integrated RF power device assembly including the RF power device or devices, the DC and RF detector and control circuits, the thermal detector circuits, the signal processing circuitry, and the optoelectronic devices and controls used to support the optical interface, in a common unitary monolithic semiconductor structure. This implementation preferably is performed in monocrystalline compound semiconductor material and monocrystalline silicon material that are integrally and compliantly formed, at different lateral locations, upon a monocrystalline substrate unitary monolithic semiconductor structure via an intervening stress-relieving substructure. Methods and materials for implementing integrated circuits and devices in both high quality monocrystalline compound semiconductor structures, namely, Group III-V compound semiconductor structures like GaAs and so forth, and monocrystalline Group IV structures, namely, silicon and/or germanium structures, upon the same handle wafer, is made possible by fabrication methods generally described in commonly assigned U.S. Pat. Nos. 6,472,276 B1 and 6,392,257 B1, which describe the provision and use of a unique strain-relieving substructure provided in such composite semiconductor structures, which descriptions are incorporated herein by reference. The above-incorporated '276 and '257 patents describe a method and materials that are applicable here for monolithic integration of Si based logic circuitry with group III-V optoelectronic devices using the same handle wafer, which can be used for high temperature and high power RF applications and optoelectronics. Such methods and structures are available to those skilled in the art to facilitate the making of integrated RF power assemblies on a single chip as described herein.

As shown in FIG. 8, the RF power device and detection circuitries provided on chip 206 are comprised of a plurality of elements, previously identified in FIG. 2, arrayed upon a common silicon substrate 800. The elements are preferably monolithically fabricated as a unitary structure by fabrication methods such as those generally described in commonly assigned U.S. Pat. Nos. 6,472,276 B1 and 6,392,257 B1. Generally speaking, these various elements are substantially intimately situated and connected upon the same substrate 800 via an accommodating buffer layer and strain-relieving interface layer.

For instance, the RF power amplifier can be implemented by fabrication of LDMOS in CMOS. The data formatting and control circuitry 211 and detection and control circuitry 202 and 204 can be implemented in either CMOS or a compound semiconductor material formed upon the common silicon substrate, but typically will be done at least partly using complimentary metal oxide semiconductor (CMOS) methodology. The optical driver/detector element 213 can comprise any optical frequency-based carrier mechanism including, for example, infrared, visible light, ultraviolet light, and so forth. For purposes of this illustrative description, the optical driver/detector element 213 comprises infrared (IR) output elements and IR input detector elements implemented in layers of compound semiconductor material (such as, for example, monocrystalline Group III-V compound semiconductor material) that has been grown over the common silicon substrate 800 via the accommodating buffer structure. In general, the choice between forming the circuits or devices in CMOS or a compound semiconductor material will include due consideration of the cost and performance requirements for a given application. Specific approaches by which to effect such structures are known in the art and are specified, for example, in publications such as those noted above. Therefore, for the sake of brevity and the preservation of clarity and focus, further elaboration regarding such details will not be set forth here.

Such processes permit the RF amplifier, silicon-based digital logic processing circuitry, the optical detector and output sensor, and the detection circuitry for the RF amplifier to be integrated onto a single chip and die. This makes it possible to provide a more reliable part while reducing fabrication costs, and reducing the space required to package the part otherwise entailed by the prior use of multiple dies and hardwire connections therebetween.

In the foregoing specification, various embodiments have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential features or elements of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A radio frequency power device module comprising:
   an active radio frequency power device having a control signal input; digital control logic formed integral to the active radio frequency power device and having:
      an information input; and
      a control signal output that is operably coupled to the control signal input of the active radio frequency power device;
   a free-space optical communications interface formed integral to the active radio frequency power device and having a received signal output that is operably coupled to the information input of the digital control logic; and
   wherein the active radio power device, digital control logic and free-space optical communication interface are housed in a common enclosure such that an optical link is formed within the enclosure between the active radio power device and the digital control logic.

2. The radio frequency power device of claim 1 and further comprising:
   an operational status detector formed integral to the active radio frequency power device and having:
      an input that is responsive to an operational state of the active radio frequency power device; and a detected status output that is operably coupled to an input of the free-space optical communications interface.

3. The radio frequency power device module of claim 2 wherein the operational state comprises at least one of:
   a direct current value that is associated with the active radio frequency power device;
   a radio frequency power condition that is associated with the active radio frequency power device; and
   a thermal state that is associated with the active radio frequency power device.

4. The radio frequency power device module of claim 3 wherein the direct current value comprises a bias level.

5. The radio frequency power device module of claim 3 wherein the radio frequency power condition comprises at least one of forward and reflected power levels.

6. The radio frequency power device module of claim 2 and further comprising a data formatter that is operably coupled between the detected status output of the operational status detector and the input of the free-space optical communications interface.

7. The radio frequency power device module of claim 1 wherein the active radio frequency power device comprises at least one of:
   a radio frequency power amplifier;
   a radio frequency power transistor;
   an LDMOS transistor.

8. The radio frequency power device module of claim 1 wherein the free-space optical communications interface comprises an emitter structure and a separate detector structure that are each implemented at least in part in a monocrystalline Group III-V compound semiconductor substrate layer.

9. The radio frequency power device module of claim 1 and further comprising:
   at least one controller formed integral to the active radio frequency power device and having:
   an input that is operably coupled to an output of the free-space optical communications interface; and
   a control signal output that is operably coupled to the control signal input of the active radio frequency power device.

10. A method comprising, in a single integrated device:
    operating an active radio frequency power device;
    monitoring, from within the single integrated device, at least one operational state as regards the active radio frequency power device to provide resultant monitoring information electrical signals;
    converting, from within the single integrated device, the resultant monitoring information electrical signals to resultant monitoring information optical signals and transmitting the resultant monitoring information optical signals in optical free-space from a free-space optical communication interface to a digital control logic formed integral to the active frequency power device and wherein the active radio power device, digital control logic and free-space optical communication interface are housed in a common enclosure such that an optical link is formed within the enclosure between the active radio power device and the digital control logic.

11. The method of claim 10 wherein monitoring, from within the single integrated device, at least one operational state as regards the active radio frequency power device comprises monitoring, from within the single integrated device, at least one operational state as regards the active radio frequency power device wherein the at least one operational state comprises at least one of:
    a direct current value that is associated with the active radio frequency power device;
    a radio frequency power condition that is associated with the active radio frequency power device; and
    a thermal state that is associated with the active radio frequency power device.

12. The method of claim 10 and further comprising:
    receiving optical free-space feedback control signals a the single integrated device;
    using the optical free-space feedback control signals to influence operation of the active radio frequency power device.

13. The method of claim 10 and further comprising:
    providing the active radio frequency power device;
    providing a free-space optical communications interface formed integral to the active radio frequency power device;
    and wherein transmitting the resultant monitoring information optical signals in optical free-space comprises using the free-space optical communications interface to transmit the resultant monitoring information optical signals in optical free-space.

14. An apparatus for telecommunications, comprising an RF power device module and a digital control unit, in operable communication with each other, wherein:
    i) the RF power device module comprises:
       a) an RF power device chip, comprising:
          an RF power component;
          a detection arrangement comprising at least one of:
             a DC detector operable to detect a direct current value associated with the RF power component and outputting a first electronic signal proportional to the detected current value to a formatting circuit,
             an RF detector operable to detect an RF power condition associated with the RF power component and outputting a second electronic signal corresponding to the detected RF power condition to the formatting circuit; and
             a thermal detector to detect a thermal state of the RF power component and outputting a third electronic signal corresponding to the detected thermal state to the formatting circuit;
          a formatting circuit operable to reformat the first, second, and third electronic signals into data signals processable by an optical emitter/detector component;
          an optical emitter/detector component operable to receive the signals outputted by the formatting circuit and transmit corresponding optical signals propagated through free space via a bi-directional optical link made with an optical signal detector/emitter component associated with diagnostic processing and control circuitry implemented on a separate chip from the RF power device chip;
       b) a diagnostic processing and control device chip, physically separated from the RF power device chip, having an optical signal detector/emitter component associated with diagnostic processing and control circuitry adapted to interpret the signals received from the RF power device chip and feed back at least one of error and compensating signals to the RF power device chip via the bi-directional optical link; and ii) a processor control unit adapted to further interpret the data signals received from the RF power device chip and feed back commands to the diagnostics processing and control chip for providing feed back signals to the RF power device chip effective to make an adjustment to an operating condition of the RF power device.

15. The apparatus of claim 14, wherein the apparatus comprises a base station.

16. The apparatus of claim 14, wherein the processor control unit is selected from a microprocessor control unit and a digital signal processing control unit.

17. The apparatus of claim 14, wherein the RF power device chip is contained in a package, and the package and the diagnostics processing and control chip are housed within a common enclosure.

18. The apparatus of claim 14, wherein the RF power component comprises an RF power amplifier.

19. The apparatus of claim 14, wherein the RF power component comprises an RF power transistor.

20. The apparatus of claim 14, wherein the RF power component comprises an LDMOS transistor.

21. The apparatus of claim 14, wherein the detection arrangement comprises each of the DC detector, the RF detector, and the thermal detector.

22. The apparatus of claim 14, wherein the detection arrangement comprises the RF detector, wherein the RF detector comprises at least one of a directional coupler and a voltage rectifier.

23. The apparatus of claim 14, wherein the detection arrangement comprises the DC detector, wherein the DC detector is operable to detect at least one of a quiescent current and a bias voltage level for a power amplifier.

24. The apparatus of claim 14, wherein the RF power chip further comprises a control circuit operably coupled to the RF power device and the processor control unit and being responsive to the feed back signals to effect the adjustment to the operating condition of the RF power device.

* * * * *